(12) United States Patent
Hamabe et al.

(10) Patent No.: US 8,681,713 B2
(45) Date of Patent: Mar. 25, 2014

(54) CARRIER ASSIGNMENT METHOD FOR CELLULAR SYSTEM, CELLULAR SYSTEM, BASE STATION, AND MOBILE STATION

(75) Inventors: Kojiro Hamabe, Tokyo (JP); Mitsuyuki Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 1311 days.

(21) Appl. No.: 12/441,813

(22) PCT Filed: Sep. 18, 2007

(86) PCT No.: PCT/JP2007/068056
§ 371 (c)(1),
(2), (4) Date: Mar. 18, 2009

(87) PCT Pub. No.: WO2008/035661
PCT Pub. Date: Mar. 27, 2008

(65) Prior Publication Data
US 2010/0085924 A1 Apr. 8, 2010

(30) Foreign Application Priority Data

Sep. 20, 2006 (JP) ................................. 2006-254045

(51) Int. Cl.
*H04B 17/00* (2006.01)
(52) U.S. Cl.
USPC ........................................ 370/329; 455/67.16
(58) Field of Classification Search
USPC ........................................ 370/329; 455/67.16
See application file for complete search history.

(56) References Cited

U.S. PATENT DOCUMENTS

| 5,487,174 | A | * | 1/1996 | Persson ........................ 455/444 |
| 5,832,368 | A | * | 11/1998 | Nakano et al. ............... 455/63.1 |
| 5,953,661 | A | * | 9/1999 | Schwinghammer et al. . 455/423 |
| 6,453,166 | B1 | * | 9/2002 | Ishikawa et al. .............. 455/450 |
| 6,515,975 | B1 | * | 2/2003 | Chheda et al. ................. 370/332 |
| 6,603,822 | B2 | * | 8/2003 | Brede et al. .................... 375/340 |
| 6,741,837 | B1 | * | 5/2004 | Nakano et al. ............. 455/67.11 |
| 6,751,444 | B1 | * | 6/2004 | Meiyappan ..................... 455/69 |
| 7,127,212 | B2 | * | 10/2006 | Fattouch ...................... 455/63.1 |
| 7,529,218 | B2 | * | 5/2009 | Lyons et al. ................... 370/338 |
| 7,945,269 | B2 | * | 5/2011 | Drakos ......................... 455/450 |
| 8,005,479 | B2 | * | 8/2011 | Meiyappan .................... 455/450 |
| 2002/0098860 | A1 | * | 7/2002 | Pecen et al. .................... 455/522 |
| 2002/0098873 | A1 | * | 7/2002 | Alexiou ......................... 455/562 |
| 2002/0160798 | A1 | * | 10/2002 | Shoji et al. .................... 455/522 |

(Continued)

FOREIGN PATENT DOCUMENTS

| JP | 1993110499 A | 4/1993 |
| JP | 1994311089 A | 11/1994 |
| JP | 1999004477 A | 1/1999 |

OTHER PUBLICATIONS

International Search Report for PCT/JP2007/068056 mailed Nov. 13, 2007.

*Primary Examiner* — Faruk Hamza
*Assistant Examiner* — Jay P Patel
(74) *Attorney, Agent, or Firm* — Sughrue Mion, PLLC

(57) ABSTRACT

The threshold value of the cell center is increased or decreased depending on the communication quality of a mobile station in the cell center. For example, if the block error rate in the communication of a mobile station in the cell center is high, the threshold value of the cell center is increased so that the mobile station in the cell center is limited to mobile stations closer to the base station.

3 Claims, 9 Drawing Sheets

(56) References Cited

U.S. PATENT DOCUMENTS

| | | | |
|---|---|---|---|
| 2004/0157561 A1* | 8/2004 | Akerberg | 455/67.11 |
| 2004/0204105 A1* | 10/2004 | Liang et al. | 455/562.1 |
| 2006/0014543 A1* | 1/2006 | Drakos | 455/450 |
| 2006/0092889 A1* | 5/2006 | Lyons et al. | 370/338 |
| 2006/0281486 A1* | 12/2006 | Ngai et al. | 455/552.1 |
| 2006/0293043 A1* | 12/2006 | Aoyama | 455/422.1 |
| 2007/0291702 A1* | 12/2007 | Nanba et al. | 370/336 |
| 2008/0049664 A1* | 2/2008 | Austin et al. | 370/328 |
| 2009/0061778 A1* | 3/2009 | Vrzic et al. | 455/62 |
| 2011/0136534 A1* | 6/2011 | Nanba et al. | 455/522 |
| 2011/0312367 A1* | 12/2011 | Meiyappan | 455/522 |
| 2012/0099552 A1* | 4/2012 | Koyanagi | 370/329 |

\* cited by examiner

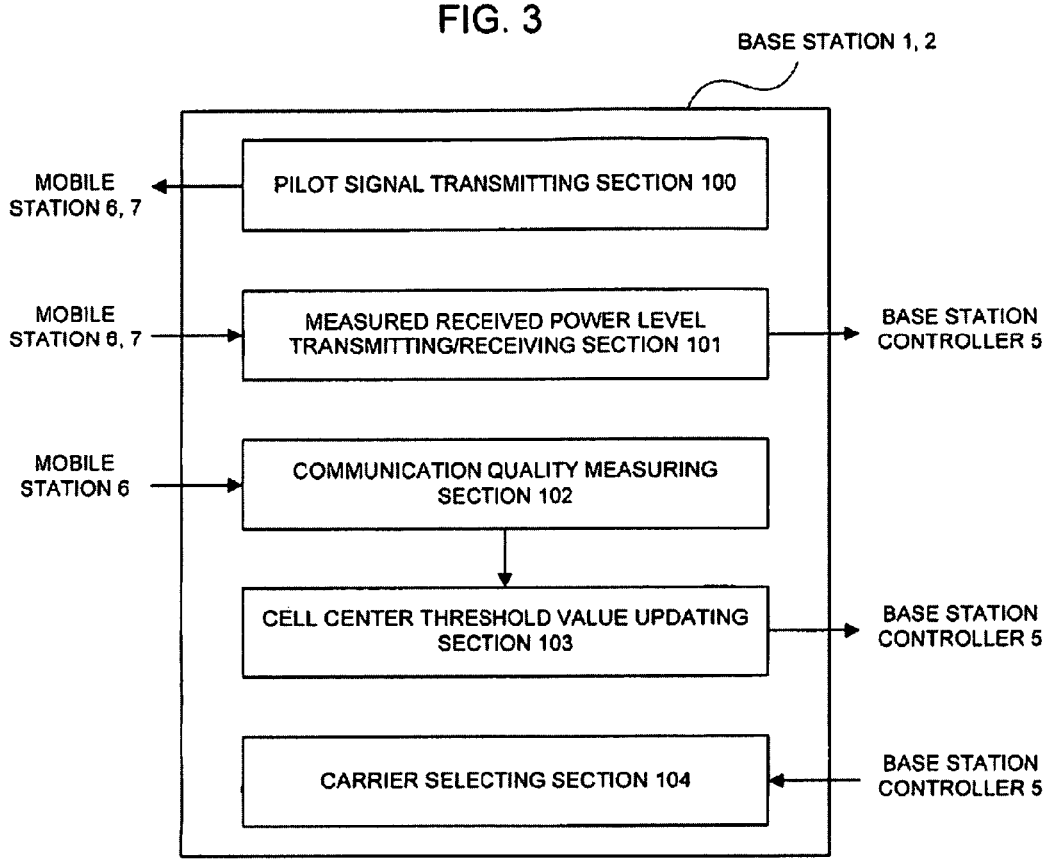
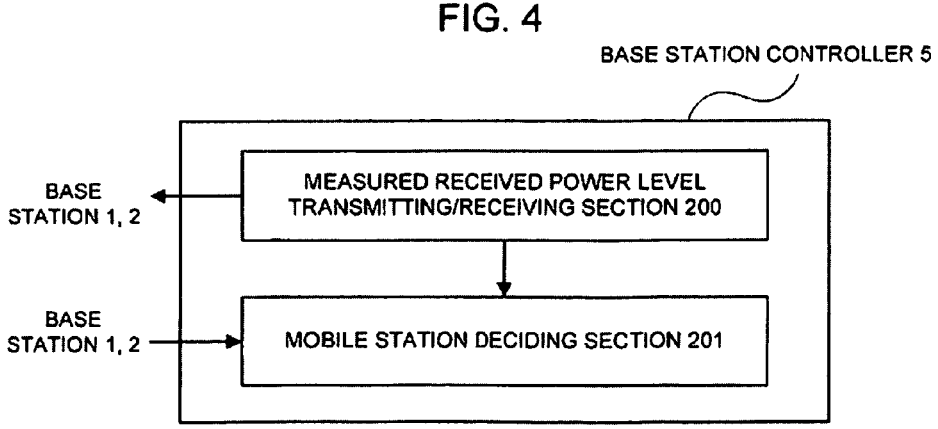

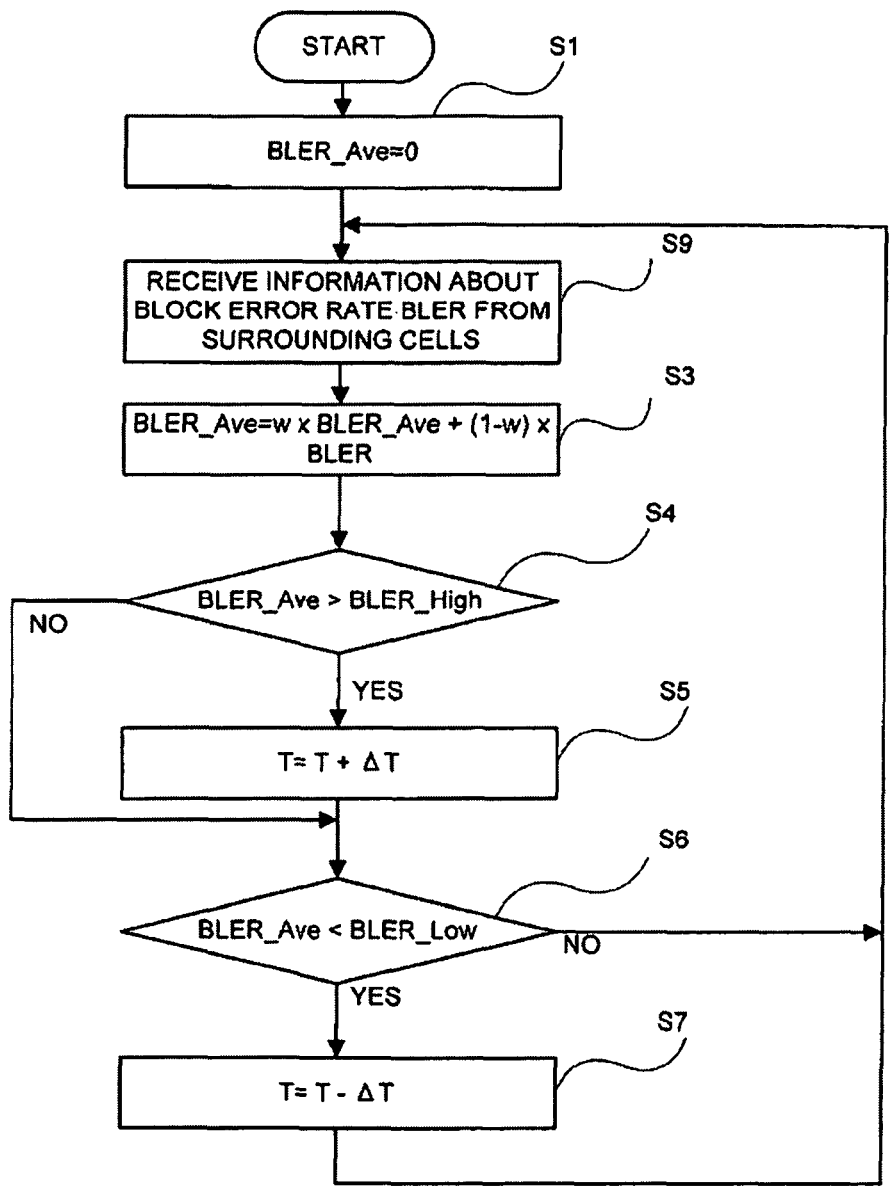

CARRIER ASSIGNMENT METHOD FOR CELLULAR SYSTEM, CELLULAR SYSTEM, BASE STATION, AND MOBILE STATION

The present application is the National Phase of PCT/JP2007/068056, filed Sep. 18, 2007, which claims priority based on Japanese Patent Application No. 2006-254045 filed on Sep. 20, 2006, disclosure of which is incorporated herein in its entirety.

TECHNICAL FIELD

The present invention relates to techniques of carrier assignment for a cellular system, and particularly to techniques of carrier assignment for a cellular system, for handling communication between a wireless network and mobile stations using carriers different between the cell center and cell edge.

BACKGROUND ART

In order that an enormous amount of user information may be communicated between a wireless network comprising at least a plurality of base stations, and a large number of mobile stations present in one or more cells formed by each of the base stations, a cellular system employs the same frequency carrier (simply referred to as carrier hereinbelow) in a plurality of cells at the same time.

In such a cellular system, to make use of the same carrier in as many cells as possible at the same time, there has been proposed a method involving dividing a cell into an area closer to the base station (referred to as a cell center hereinbelow) and an area farther from the base station (referred to as a cell edge hereinbelow) as shown in FIG. 1; allocating a predetermined carrier (F) to the cell center of all cells for use at the same time; and dividing the remaining carriers into three groups (f1, f2, f3), for example, in the cell edge and allocating each group to every third cells for use, for preventing simultaneous use of one group in mutually adjacent cells (see Patent Document 1, for example).

To achieve such use of a carrier, a base station transmits a common pilot signal at a predetermined level of transmission power in its cell, and a mobile station receives the common pilot signal from a plurality of nearby base stations and measures the levels of the received power. A cell having the highest level of the received power is regarded as a cell of the mobile station's own for communication, and a cell having the second highest level of the common pilot signal is regarded as an adjacent cell, where the mobile station uses the carrier of the cell center when the ratio of the received power level of the common pilot signal for its own cell and that for an adjacent cell is equal to or greater than a predetermined threshold value (referred to as a cell center threshold value hereinbelow). Otherwise, the mobile station uses the carrier of the cell edge. Alternatively, rather than using the ratio of the received power levels of the common pilot signal, a method of using a carrier of the cell center when reception quality of the common pilot (e.g., the received power level of the common pilot signal, or the ratio of the power level of the received common pilot signal and that of an interference signal) for its own cell is equal to or greater than a predetermined threshold value may be contemplated.

Thus, a cellular system using carriers in a plurality of cells at the same time should use as many carriers as possible at a higher utilization rate in as many cells as possible so that the whole system has improved spectral efficiency and increased traffic capacity.

Patent Document 1: JP-1994-311089A

DISCLOSURE OF THE INVENTION

Problems to be Solved by the Invention

However, in deciding a mobile station to lie in the cell center, too a high cell center threshold value results in a reduced cell center area and hence a reduced number of mobile stations admitted in the cell center, and accordingly, not so many carriers can be used in many cells at the same time, leading to a problem that the whole system has reduced spectral efficiency. On the other hand, too a low cell center threshold value results in interference of a carrier of the cell center with the same carrier used in its adjacent cell and transmission efficiency is lowered, again leading to a problem that the whole system has reduced spectral efficiency.

Moreover, since the optimal value of the cell center threshold value is dependent upon arrangement of cells and is different among the cells, it is difficult to assign an optimal value to each cell beforehand.

The present invention has been made in view of such issues, and its object is to provide techniques for solving the aforementioned problems to assign an optimal cell center threshold value and improve carrier utilization efficiency.

Means to Solve the Problem

The present invention for solving the above-mentioned problems is a carrier assignment method for a cellular system comprised of a wireless network that is comprised of at least a plurality of base stations, and a plurality of mobile stations, wherein said method comprises: a step in which said wireless network classifies each of the mobile stations into a cell center mobile station lying near the base stations and a cell edge mobile station lying away from the base stations from a propagation loss between the mobile station and a base station with which the mobile station communicates and a predetermined cell center threshold value; a step in which said wireless network makes communication with said cell center mobile station using a first carrier and communication with said cell edge mobile station using a second carrier; a step in which said wireless network measures quality of communication using said first carrier; and a step in which said wireless network modifies said cell center threshold value using said quality of communication.

The present invention for solving the above-mentioned problems is a carrier assignment method for a cellular system comprised of a wireless network that is comprised at least a plurality of base stations, and a plurality of mobile stations, wherein said method comprises: a step in which said plurality of base stations transmit pilot signals; a step in which said mobile stations receive said pilot signals transmitted by one or a plurality of said base stations; a step in which said wireless network classifies each of said mobile stations into a cell center mobile station lying near the base stations and a cell edge mobile station lying away from the base stations from reception quality of said pilot signals and a predetermined cell center threshold value; a step in which said wireless network makes communication with said cell center mobile station using a first carrier and communication with said cell edge mobile station using a second carrier; a step in which said wireless network measures quality of communication using said first carrier; and a step in which said wireless network modifies said cell center threshold value using said quality of communication.

The present invention for solving the above-mentioned problems is a carrier assignment method of, in a cellular system comprised of a wireless network that is comprised of at least a plurality of base stations, and a plurality of mobile stations, making carriers for use in communication different between a cell center mobile station lying near the base stations and a cell edge mobile station lying away from the base stations, wherein a cell center threshold value for use in classification into said cell center mobile station and said cell edge mobile station is modified using quality of communication at said cell center mobile station.

The present invention for solving the above-mentioned problems is a cellular system comprised of a wireless network that is comprised of at least a plurality of base stations, and a plurality of mobile stations, wherein the cellular system comprises: means for classifying each of the mobile stations into a cell center mobile station lying near the base stations and a Cell edge mobile station lying away from the base stations from a propagation loss between the mobile station and a base station with which the mobile station communicates and a predetermined cell center threshold value; means for making communication with said cell center mobile station using a first carrier and communication with said cell edge mobile station using a second carrier; means for measuring quality of communication using said first carrier; and means for modifying said cell center threshold value using said quality of communication.

The present invention for solving the above-mentioned problems is a cellular system comprised of a wireless network that is comprised of at least a plurality of base stations, and a plurality of mobile stations, wherein said plurality of base stations comprises means for transmitting pilot signals, said mobile stations comprise means for receiving said pilot signals transmitted by one or a plurality of said base stations, and said wireless network comprises: means for classifying each of the mobile stations into a cell center mobile station lying near the base stations and a cell edge mobile station lying away from the base stations from reception quality of said pilot signals and a predetermined cell center threshold value; means for making communication with said cell center mobile station using a first carrier and communication with said cell edge mobile station using a second carrier; means for measuring quality of communication using said first carrier; and means for modifying said cell center threshold value using said quality of communication.

The present invention for solving the above-mentioned problems is a cellular system comprised of a wireless network that is comprised of at least a plurality of base stations, and a plurality of mobile stations, and for making carriers for use in communication different between a cell center mobile station lying near the base stations and a cell edge mobile station lying away from the base stations, wherein the cellular system comprises means for modifying a cell center threshold value for use in classification into said cell center mobile station and said cell edge mobile station using quality of communication at said cell center mobile station.

The present invention for solving the above-mentioned problems is a base station in a cellular system comprised of a wireless network that is comprised of at least a plurality of base stations, and a plurality of mobile stations, wherein said base station comprises: means for transmitting a pilot signal; means for measuring quality of communication with a mobile station classified into a cell center mobile station from reception quality of said pilot signal and a cell center threshold value; and means for modifying said cell center threshold value using said quality of communication.

The present invention for solving the above-mentioned problems is a base station in a cellular system comprised of a wireless network that is comprised of at least a plurality of base stations, and a plurality of mobile stations, wherein said base station comprises: means for transmitting a pilot signal; means for measuring quality of communication with a mobile station classified into a cell center mobile station from reception quality of said pilot signal and a cell center threshold value; and means for reporting said quality of communication to a base station controller.

The present invention for solving the above-mentioned problems is a base station in a cellular system comprised of a wireless network that is comprised of at least a plurality of base stations, and a plurality of mobile stations, wherein said base station comprises: means for transmitting a pilot signal; means for measuring quality of communication with a mobile station classified into a cell center mobile station from reception quality of said pilot signal and a cell center threshold value; means for reporting said quality of communication to other base station; and means for modifying said cell center threshold value using the quality of communication reported from other base station.

The present invention for solving the above-mentioned problems is a program for carrier assignment for, in a cellular system comprised of a wireless network that is comprised of at least a plurality of base stations, and a plurality of mobile stations, making carriers for use in communication different between a cell center mobile station lying near the base stations and a cell edge mobile station lying away from the base stations, wherein said program causes an information processing apparatus to execute the processing of modifying a cell center threshold value for use in classification into said cell center mobile station and said cell edge mobile station using quality of communication at said cell center mobile station.

Effects of the Invention

According to the present invention, when quality of communication in the cell center is satisfactory, the cell center threshold value is lowered to thereby increase the number of mobile stations admitted in the cell center, increase the number of carriers that can be used in many cells at the same time, and allow voluminous data transmission. On the other hand, when quality of communication in the cell center is unsatisfactory, the cell center threshold value is raised to restrict mobile stations admitted in the cell center to those closer to the base station, and thus, quality of communication in the cell center is improved to allow efficient data transmission. Therefore, according to the present invention, spectral efficiency can be improved.

BRIEF DESCRIPTION OF THE DRAWINGS

FIG. 3 is a block diagram of base stations 1, 2 in a first embodiment.

FIG. 4 is a block diagram of a base station control station 5 in the first embodiment.

FIG. 11 is a flow chart showing the method of updating the cell center threshold value in the third embodiment.

EXPLANATION OF SYMBOLS 1, 2 Base station
3, 4 Cell
5 Base station controller
6, 7 Mobile station
8 Gateway apparatus

BEST MODES FOR CARRYING OUT THE INVENTION

First Embodiment

A first embodiment of the present invention will now be described.

Figure 1:
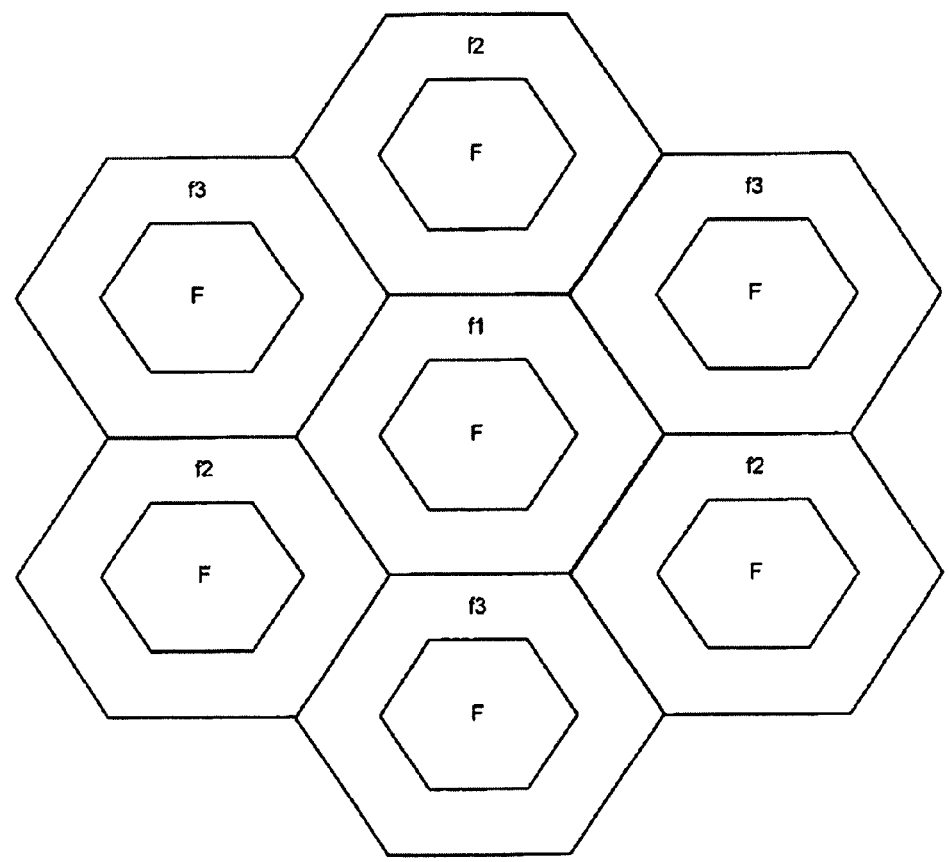
FIG. 1 shows an example of carrier arrangement for cells in the conventional technique.
Figure 2:
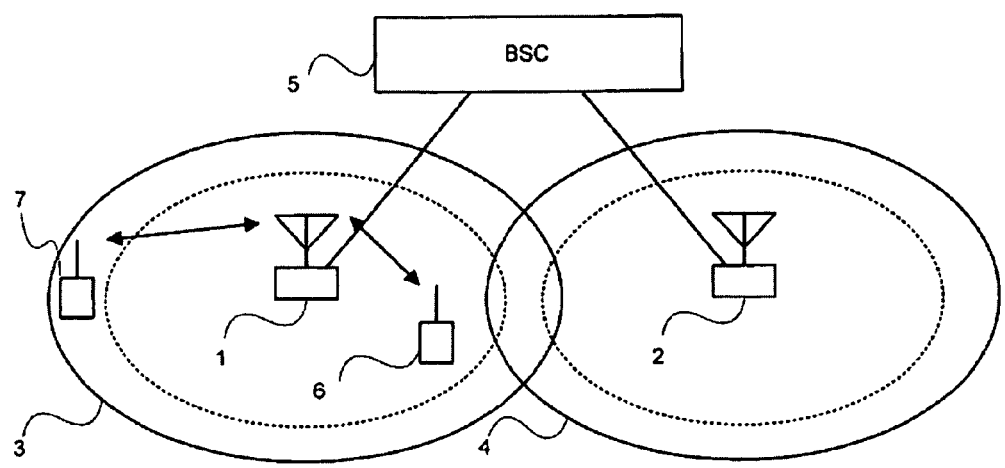
FIG. 2 is a configuration diagram of a cellular system in several embodiments of the present invention.

FIG. 2 is a configuration diagram of a cellular system in the first embodiment, wherein the cellular system is comprised of a wireless network, and mobile stations 6-7. The wireless network is comprised of base stations 1-2, cells 3-4 covered by the base stations, and a base station controller 5 (BSC) connected to the base stations. The cellular system additionally includes a large number of base stations and mobile stations, although not shown.

The cellular system allows a plurality of carriers to be used in communication between base stations and mobile stations. Each carrier includes an upstream carrier and a downstream carrier, and the upstream line and downstream line use mutually different carriers in a Frequency Division Duplex scheme. The modulation scheme employed is an OFDM scheme. Moreover, the frequency band occupied by one carrier has a value common to all carriers (e.g., 5 MHz).

Each carrier is segmented by a unit transmission time, where when a base station communicates with a mobile station, the base station selects a carrier used for the mobile station, assigns a transmission time based on the unit transmission time, and conducts transmission of data blocks in the transmission time. In a unit transmission time, one data block can be transmitted.

Each data block is appended with an error detection code, with which the receiver decides the presence of a reception error for the data block, and if an error is found, the receiver sends a NACK signal to the transmitter and retains the received data block; if no error is found, it sends an ACK signal. The transmitter then retransmits the same data block when the NACK signal is received, and the receiver combines the retransmitted data block with the retained data block and receives the present data block. Thus, each data block can be properly received in a smaller number of transmission operations.

In such a condition, if the occurrence probability of the reception error for data blocks, that is, the frequency of retransmission of data blocks, is higher, the average number of retransmission operations for the data blocks is increased, and hence, the transmission delay time for the data blocks increases. They are all indicators of quality of communication, and when the cell center threshold value is to be updated, one of these indicators of quality of communication is used.

The wireless network decides whether each of the mobile stations is one lying near the base station (referred to as cell center mobile station hereinbelow) or one lying away from the base station (referred to as cell edge mobile station hereinbelow) from a propagation loss between the mobile station and a base station with which the mobile station communicates and the cell center threshold value. The propagation loss here is determined at a mobile station by a received power level of a pilot signal transmitted by a base station at a certain level of power.

Next, a configuration and an operation of several portions in the first embodiment will be described with reference to the configuration diagram of the cellular system shown in FIG. 2, block diagrams of several portions shown in FIGS. 3-5, and a flow chart shown in FIG. 6. The first embodiment addresses a case in which each of the base stations 1, 2 updates the cell center threshold value.

As shown in FIG. 3, each base station 1, 2 includes a pilot signal transmitting section 100 for transmitting a pilot signal (not shown) at a certain level of power, a measured received power level transmitting/receiving section 101 for receiving a measured received power level from the mobile stations 6, 7 and reporting it to the base station controller 5, a communication quality measuring section 102 for measuring quality of communication (e.g., a block error rate) with the mobile stations 6, 7, a cell center threshold value updating section 103 for updating the cell center threshold value based on the result of measurement by the communication quality measuring section 102 and reporting the threshold value to the base station controller 5, and a carrier selecting section 104 for selecting a carrier for communication with the mobile stations 6, 7 based on the report from the base station controller 5.

As shown in FIG. 4, the base station controller 5 includes a measured power receiving section 200 for receiving the report of the measured received power levels of the mobile stations 6, 7 sent by the base stations 1, 2, and a mobile station deciding section 201 for making a decision regarding a cell center mobile station or a cell edge mobile station based on the measured received power levels of the mobile stations 6, 7.

Figure 5:
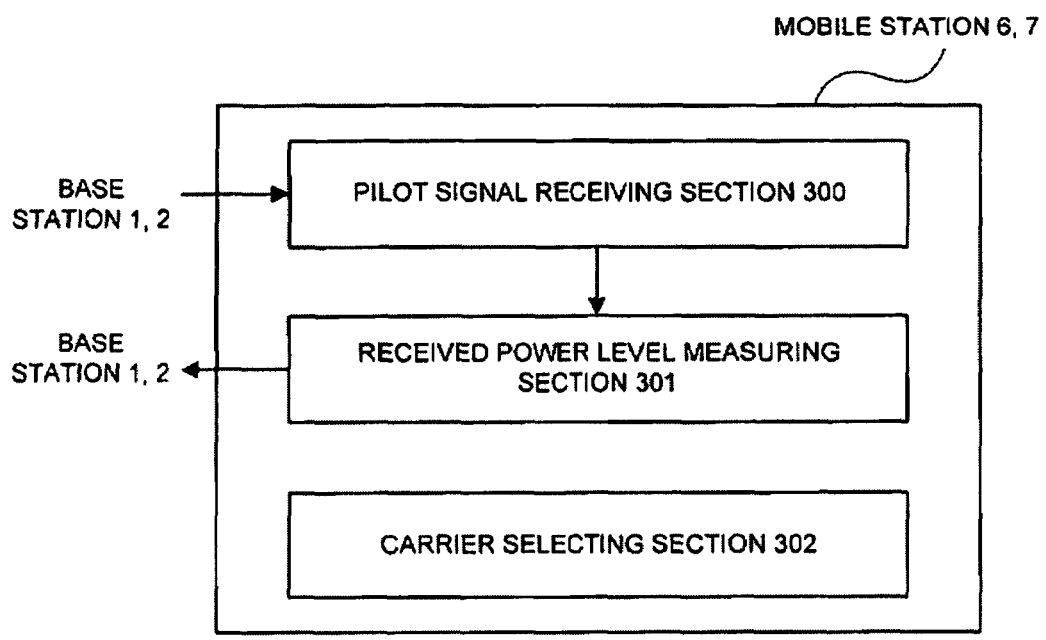
FIG. 5 is a block diagram of mobile stations 6, 7 in the first embodiment.
Figure 6:
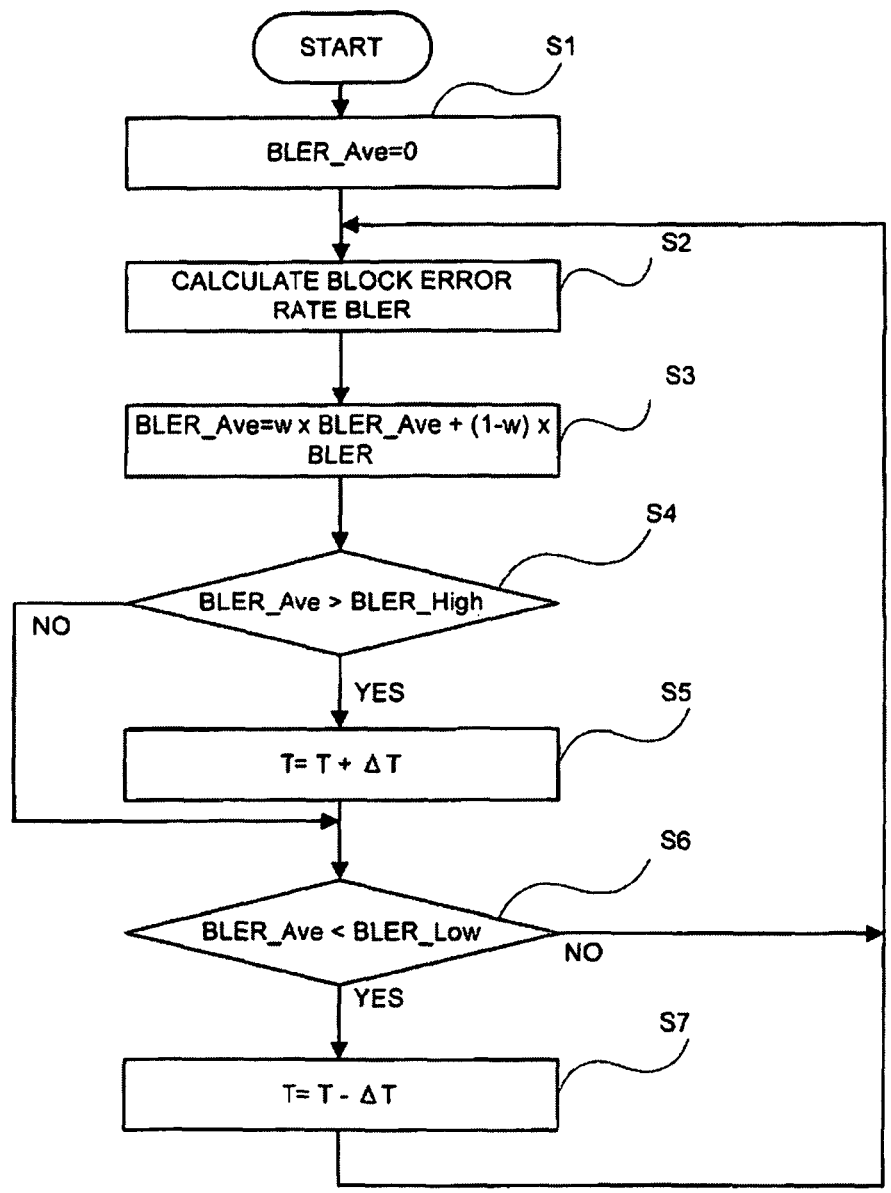
FIG. 6 is a flow chart showing a method of updating the cell center threshold value in the first embodiment.

As shown in FIG. 5, each mobile station 6, 7 includes a pilot signal receiving section 300, a received power level measuring section 301 for measuring a received power level of the received pilot signal and reporting the measured received power level to the base stations 1, 2, and a carrier selecting section 302 for selecting a carrier for communication with the base stations 1, 2.

In such a configuration, these sections operate as follows:

First, the pilot signal transmitting section 100 in the base station 1 transmits a pilot signal at a certain level of power.

The pilot signal receiving section 300 in the mobile stations 6, 7 receives the pilot signal from the base station 1, and the received power level measuring section 301 measures the received power levels P1, P2. The result of the measurement is then reported to the base station controller 5 via the measured received power level transmitting/receiving section 101 in the base station 1.

The measured power receiving section 200 in the base station controller 5 receives the received power levels P1 P2 for the mobile stations 6, 7. If the received power level P1 for the mobile station 6 is the largest of the received power levels P1, P2 of the mobile stations 6, 7, the mobile station deciding section 201 in the base station controller 5 selects the base station 1 for a base station for communication. It then selects the received power level P2 of the mobile station 7 that is the next largest, and compares their ratio P1/P2 with a cell center threshold value T. If P1/P2≥T, the mobile station is decided to lie in the cell center. If P1/P2<T, the mobile station is decided to lie in the cell edge. In the example of FIG. 2, the mobile station 6 is decided to lie in the cell center, and the mobile station 7 is decided to lie in the cell edge.

In the first embodiment, a plurality of carriers are classified into a carrier group F and carrier groups f1, f2, f3 for each of an upstream line and a downstream line, where the carrier group F is available for communication with mobile stations lying in the cell centers of all the cells 3, 4, the carrier group f1 is available for communication with mobile stations lying in the cell edge of the cell 3, and the carrier group F2 is available for communication with mobile stations lying in the cell edge of the cell 4. Moreover, the carrier group f3 is available in a cell that is not shown.

Since the mobile station 6 lies in the cell center, the carrier selecting section 104 in the base station 1 and the carrier selecting section 302 in the mobile stations 6, 7 select a carrier in the carrier group F for use when communication is established between the base station 1 and mobile station 6. Moreover, since the mobile station 7 lies in the cell edge, they select a carrier in the carrier group f1 for use when communication is established between the base station 1 and mobile station 7.

Next, an operation of updating the cell center threshold value T by the communication quality measuring section 102 and cell center threshold value updating section 103 in the base station 1 will now be described.

The cell center threshold value T takes one value for each cell. FIG. 6 is a flow chart showing a method of updating a cell center threshold value T.

First, the cell center threshold value updating section 103 initializes an average block error rate BLER_Ave (Step S1).

Next, the communication quality measuring section 102 calculates a block error rate (BLER) for communication by all mobile stations lying in the cell center (the mobile station 6 in the case of FIG. 2) each time a certain number N of blocks are properly received (Step S2). The block error rate is calculated here by M/N, where the number of blocks received by the receiver deciding that the data block has no reception error is represented by N, and the number of blocks thereamong that have been decided to have a reception error is represented as M in the first transmission. The block error rate BLER is then used to update the average block error rate BLER_Ave (Step S3). The updating is achieved by using a weighting factor w (e.g., w=0.9) according to the following equation:

$$BLER\_Ave = w \times BLER\_Ave + (1-w) \times BLER.$$

If BLER_Ave is greater than an upper threshold value BLEB_High of the block error rate, the cell center threshold value updating section 103 increases the cell center threshold value T by a certain value $\Delta T$ (Steps S4, S5). On the other hand, if BLEB_Ave is smaller than a lower threshold value BLER_Low of the block error rate, it decreases the cell center threshold value T by a certain value $\Delta T$ (Steps S6, S7).

The trigger by which the block error rate is calculated at Step S2 is not limited to the aforementioned timing, and it may be calculated when a certain period of time has passed, or when the number of mobile stations of interest that have made communication in a certain amount or more in a cell of interest has reached a certain value.

Second Embodiment

A second embodiment will now be described.

Figure 7:
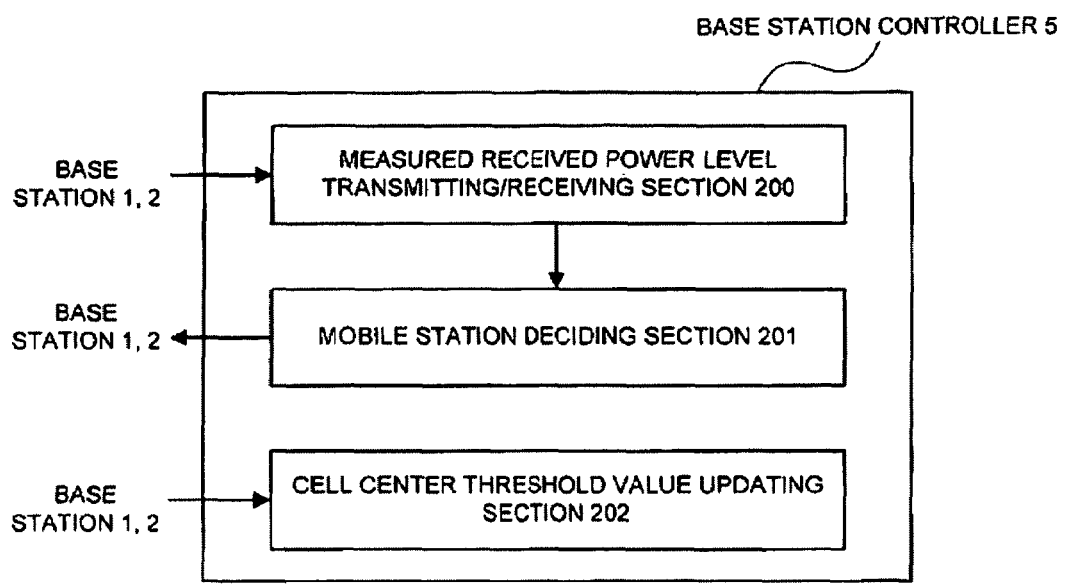
FIG. 7 is a block diagram of the base station control station 5 in a second embodiment.

While the first embodiment addresses a case in which the base stations 1, 2 update the cell center threshold value T, in the second embodiment, a case in which the base station controller 5 updates the cell center threshold value T will be described. Accordingly, as shown in FIG. 7, a cell center threshold value updating section 202, which is similar to the cell center threshold value updating section 103 in the base stations 1, 2 described regarding the first embodiment, is provided in the base station controller 5.

It should be noted that decision regarding a cell center mobile station or a cell edge mobile station, and selection of a carrier for use in communication are made by the base station controller 5 in the following description. A method of deciding the cell center mobile station or cell edge mobile station and a method of selecting a carrier available for each cell and a carrier to be assigned to a mobile station are similar to those in the first embodiment. Description of portions similar to those in the first embodiment described above will be omitted.

Next, an operation of updating the cell center threshold value T by the communication quality measuring section 102 in the base station 1 and the cell center threshold value updating section 202 in the base station controller 5 will now be described.

Figure 8:
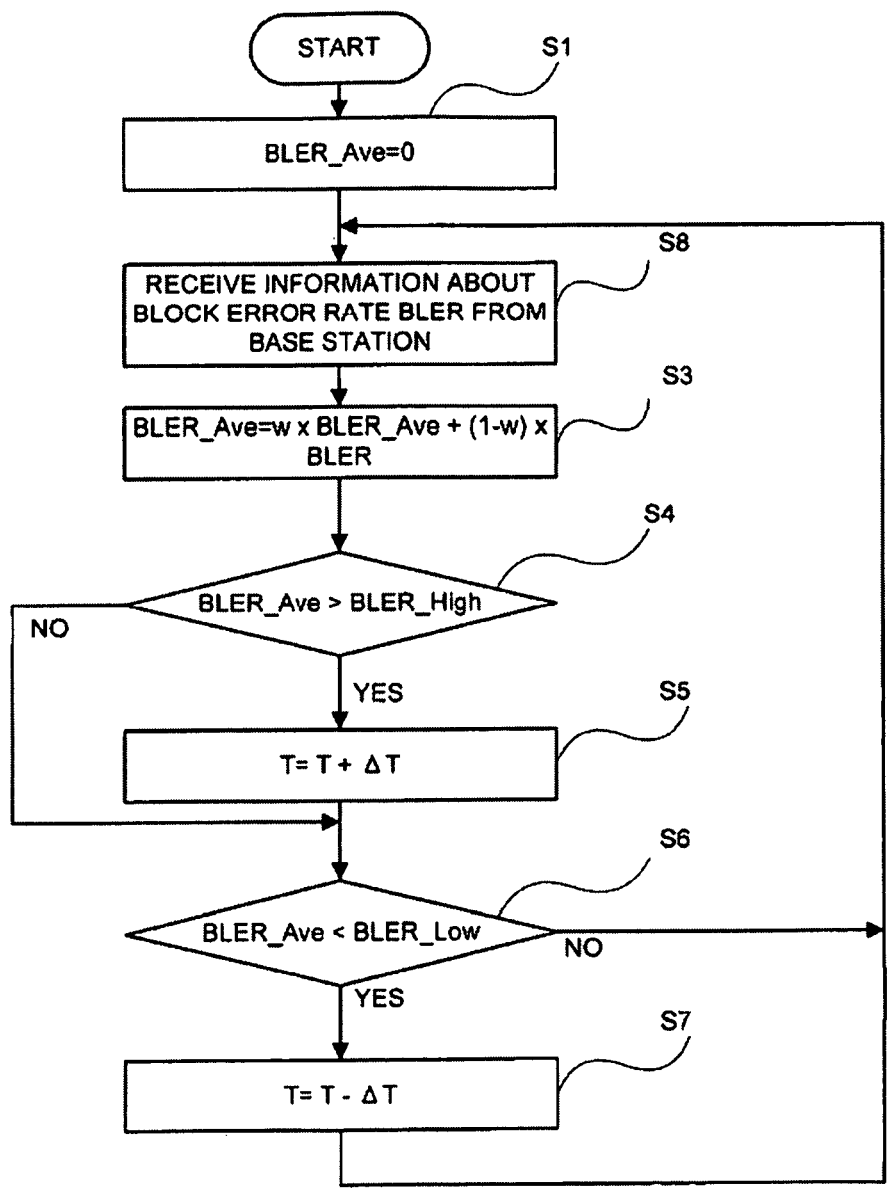
FIG. 8 is a flow chart showing the method of updating the cell center threshold value in the second embodiment.

In the second embodiment, the cell center threshold value T takes one value for each cell. FIG. 8 is a flow chart showing a method of updating the cell center threshold value.

First, the cell center threshold value updating section 202 in the base station controller 5 initializes an average block error rate BLER_Ave (Step S1). The communication quality measuring section 102 in the base stations 1, 2 calculates a block error rate (BLER) for communication by all mobile stations lying in the cell center (the mobile station 6 in the case of FIG. 2) as in the first embodiment and reports the result to the base station controller 5, and the cell center threshold value updating section 202 in the base station controller 5 receives the report (Step S8). At Steps S3-S7, the cell center threshold value is updated as in the first embodiment.

Third Embodiment

A third embodiment will now be described.

Figure 9:
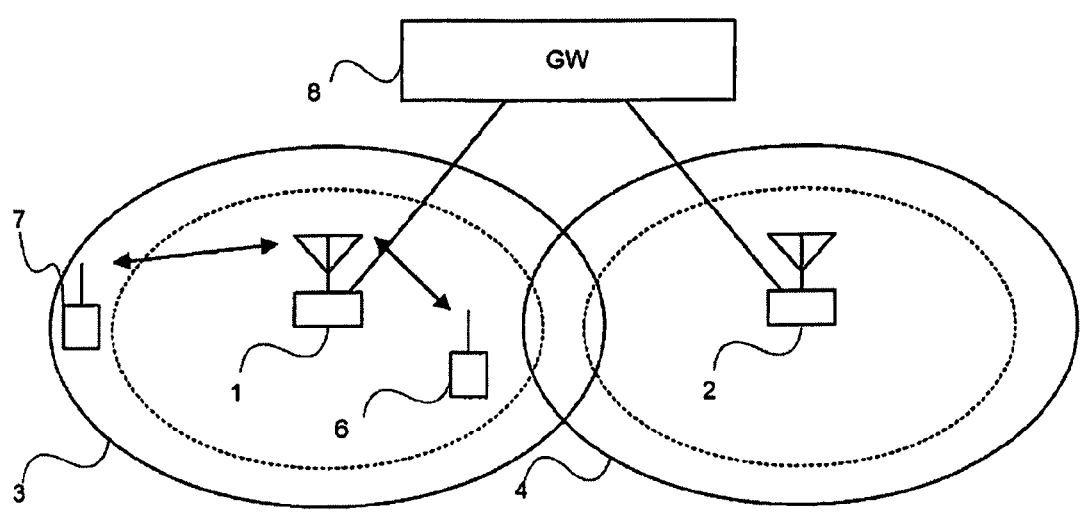
FIG. 9 is a configuration diagram of a cellular system in a third embodiment.
Figure 10:
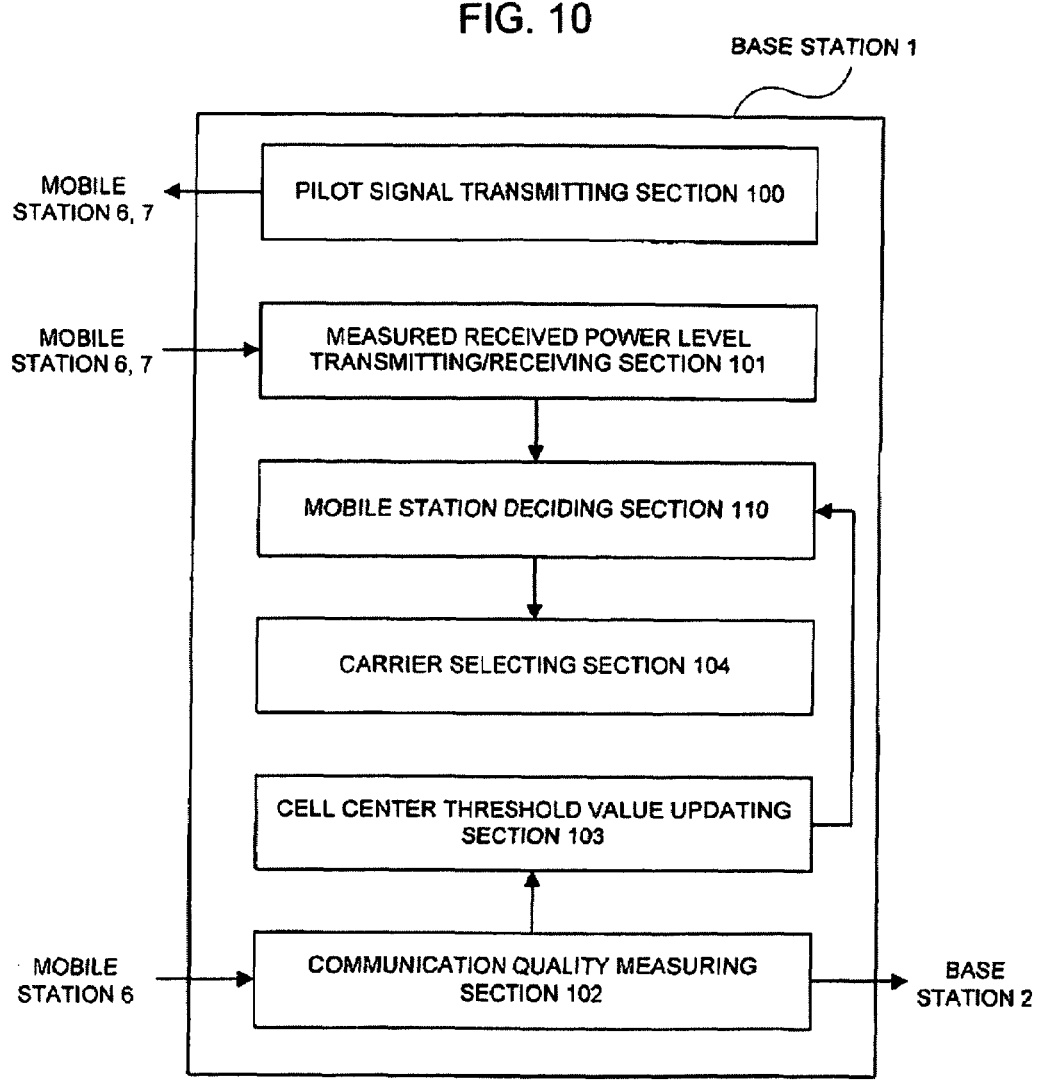
FIG. 10 is a block diagram of the base stations 1, 2 in the third embodiment.

In the third embodiment, as shown in a configuration diagram of a cellular system in FIG. 9, the base stations 1, 2 are connected to a gateway apparatus 8, in place of the base station controller 5 in the first embodiment, allowing exchange of control information between the base stations. While the base stations 1, 2 update the cell center threshold value T using a block error rate measured in each base station in the first embodiment, information on the block error rate is exchanged between the base stations, and the cell center threshold value T is updated using the information in the third embodiment. Moreover, as shown in FIG. 10, since decision regarding a cell center mobile station or a cell edge mobile station is made by the base stations 1, 2 in place of the base station controller 5, they are provided with a mobile station deciding section 110 similar to the mobile station deciding section 201.

Selection of a carrier available for each cell and a carrier to be assigned to a mobile station is similar to those in the first embodiment. Description of portions similar to those in the first embodiment described above will be omitted. It should be noted that a wireless network for a cellular system in the present embodiment is comprised of base stations and cells covered by the base stations.

In FIG. 9, the pilot signal transmitting section 100 in the base stations 1, 2 transmits a pilot signal at a certain level of power.

The pilot signal receiving section 300 in the mobile stations 6, 7 receives the pilot signal from the base station 1, and the received power level measuring section 301 measures the received power levels P1, P2. The result of the measurement is then reported to the base station 1. If P1 is the largest thereof, the mobile station deciding section 110 in the base station 1 selects the base station 1 for a base station for communication, then selects P2 that is the next largest received power level, and compares their ratio P1/P2 with the cell center threshold value T. If P1/P2≥T, the mobile station is decided to lie in the cell center. If P1/P2<T, the mobile station is decided to lie in the cell edge. In the example of FIG. 9, the mobile station 6 is decided to lie in the cell center, and the mobile station 7 is decided to lie in the cell edge.

Next, an operation of updating the cell center threshold value T by the communication quality measuring section 102 and cell center threshold value updating section 103 in the base station 1 will now be described.

In the third embodiment, the cell center threshold value T takes one value for each cell. FIG. 11 is a flow chart showing a method of updating the cell center threshold value. First, the cell center threshold value updating section 103 in the base station 1 initializes an average block error rate BLER_Ave (Step S1). The communication quality measuring section 102 in the base station calculates a block error rate (BLER) for communication by all mobile stations lying in the cell center (the mobile station 6 in the case of FIG. 2) as in Embodiment 1, and reports the result to another base station (e.g., base station 2). Thus, the base station 2 receives the report about BLER from another base station (e.g., base station 1) (Step S9). At Steps S3-S7, the cell center threshold value is updated as in the first embodiment.

Fourth Embodiment

A fourth embodiment will now be described.

While decision regarding mobile stations between a cell center mobile station and a cell edge center mobile station in the fourth embodiment is similar to that in the third embodiment, arrangement of carriers available for cells is different from that in the third embodiment.

In the fourth embodiment, a plurality of carriers are classified into a carrier group 1 available for communication with mobile stations lying in the cell center and a carrier group 2 available for communication with mobile stations lying in the cell edge for each of an upstream line and a downstream line. While the carrier group 1 employs the OFDM scheme without any modification, the carrier group 2 also employs the OFDM scheme but with modification to allow communication of a plurality of mobile stations not only with a base station in the same cell but also with a base station in an adjacent cell using the same carrier at the same time by code multiplexing.

When communication is established between the base station 1 and the mobile station 6 lying in the cell center, a carrier in the carrier group 1 is selected for use. When communication is established between the base station 1 and the mobile station 7 lying in the cell edge, a carrier in the carrier group 2 is selected for use. When the carrier group 2 is used, the base station should select and assign a code for code multiplexing.

Other portions in the fourth embodiment, including a method of updating a cell center threshold value, are similar to those in the third embodiment.

While the first to fourth embodiments have been described, the present invention is not limited to these embodiments, and may be practiced in a similar way using any indicator pertinent to a propagation loss between a base station and a mobile station to make decision regarding a mobile station lying in the cell center or that lying in the cell edge. For example, in a case that transmission power control is made at a mobile station in an upstream line such that the signal power of the mobile station received at a base station is constant, the present invention may be practiced in a similar way by using an inverse of the upstream transmitted power level as an indicator.

Moreover, while the fourth embodiment is described as being different from the third embodiment in that the former employs code multiplexing, code multiplexing may similarly be applied to the first or second embodiment.

In addition, while the foregoing description has been made on an indicator of quality of communication using the block error rate, the present invention may be alternatively practiced in a quite similar way using the frequency of retransmission of data blocks, the average number of retransmission operations for data blocks, or the transmission delay time for data blocks.

Furthermore, the cell center threshold value updating section, etc. in the first to fourth embodiments may be configured by an information processing apparatus operated by a program.

The invention claimed is:

1. A carrier assignment method for a cellular system comprised of a wireless network that is comprised of at least a plurality of base stations, and a plurality of mobile stations, wherein said method comprises:
   a step in which said wireless network classifies each of the mobile stations into a cell center mobile station lying near the base stations and a cell edge mobile station lying away from the base stations from a propagation loss between the mobile station and a base station with which the mobile station communicates and a predetermined cell center threshold value to be used for determining whether a first carrier can be commonly used for a plurality of cells;
   a step in which said wireless network makes communication with said cell center mobile station using said first carrier and communication with said cell edge mobile station using a second carrier;
   a step in which said wireless network measures quality of communication using said first carrier;
   a step in which said wireless network modifies said cell center threshold value using said quality of communication using said first carrier;
   a step in which one or more of said base stations transmit pilot signals at a certain mobile station;
   a step in which when, out of levels of reception quality of said pilot signals received at said certain mobile station from said one or more of said plurality of base stations, a ratio of the highest level and the second highest level is greater than said predetermined cell center threshold value, deciding the mobile station as a cell center mobile station, or otherwise, deciding the mobile station as a cell edge mobile station;
   a step in which when a frequency of retransmission of data blocks, an average number of retransmission for data blocks or transmission delay time for data blocks is greater than a first quality threshold value, modifying the cell center threshold value to a higher value; and a step in which when the frequency of retransmission of data blocks, the average number of retransmission for data blocks or the transmission delay time for data blocks is smaller than a second quality threshold value, modifying the cell center threshold value to a lower value.

2. A carrier assignment method for a cellular system comprised of a wireless network that is comprised at least a plurality of base stations, and a plurality of mobile stations, wherein said method comprises:

a step in which said plurality of base stations transmit pilot signals;

a step in which said mobile stations receive said pilot signals transmitted by one or a plurality of said base stations;

a step in which said wireless network classifies each of said mobile stations into a cell center mobile station lying near the base stations and a cell edge mobile station lying away from the base stations from reception quality of said pilot signals and a predetermined cell center threshold value to be used for determining whether a first carrier can be commonly used for a plurality of cells;

a step in which said wireless network makes communication with said cell center mobile station using said first carrier and communication with said cell edge mobile station using a second carrier;

a step in which said wireless network measures quality of communication using said first carrier;

a step in which said wireless network modifies said cell center threshold value using said quality of communication using said first carrier;

a step in which when, out of levels of reception quality of said pilot signals received at a certain mobile station from one or a plurality of base stations, a ratio of the highest level and the second highest level is greater than said predetermined cell center threshold value, deciding the mobile station as a cell center mobile station, or otherwise, deciding the mobile station as a cell edge mobile station;

a step in which when a frequency of retransmission of data blocks, an average number of retransmission for data blocks or transmission delay time for data blocks is greater than a first quality threshold value, modifying the cell center threshold value to a higher value; and a step in which when the frequency of retransmission of data blocks, the average number of retransmission for data blocks or the transmission delay time for data blocks is smaller than a second quality threshold value, modifying the cell center threshold value to a lower value.

3. A carrier assignment method of, in a cellular system comprised of a wireless network that is comprised of at least a plurality of base stations, and a plurality of mobile stations, making carriers for use in communication different between a cell center mobile station lying near the base stations and a cell edge mobile station lying away from the base stations, wherein a cell center threshold value to be used for determining whether a first carrier can be commonly used for a plurality of cells for use in classification into said cell center mobile station and said cell edge mobile station is modified using quality of communication at said cell center mobile station using said first carrier, and wherein the method comprises steps of:

a step in which one or more of said plurality of base stations transmit pilot signals at a certain mobile station;

a step in which when, out of levels of reception quality of said pilot signals received at said certain mobile station from said one or more of said plurality of base stations, a ratio of the highest level and the second highest level is greater than a predetermined cell center threshold value, deciding the mobile station as a cell center mobile station, or otherwise, deciding the mobile station as a cell edge mobile station;

when a frequency of retransmission of data blocks, an average number of retransmission for data blocks or transmission delay time for data blocks is greater than a first quality threshold value, modifying the cell center threshold value to a higher value; and when the frequency of retransmission of data blocks, the average number of retransmission for data blocks or the transmission delay time for data blocks is smaller than a second quality threshold value, modifying the cell center threshold value to a lower value.

* * * * *